(12) United States Patent
Gaus et al.

(10) Patent No.: US 8,176,926 B2
(45) Date of Patent: May 15, 2012

(54) BATCH DISHWASHER WITH WASTE WATER HEAT RECOVERY

(75) Inventors: Bruno Gaus, Offenburg (DE); Joachim Kupetz, Berghaupten (DE); Denis Lehmann, Ortenberg (DE); Thomas Naeger, Offenburg (DE); Thomas Peukert, Buehl (DE); Vera Schneider, Offenburg (DE)

(73) Assignee: Meiko Maschinenbau GmbH & Co. KG, Offenburg (DE)

( * ) Notice: Subject to any disclaimer, the term of this patent is extended or adjusted under 35 U.S.C. 154(b) by 428 days.

(21) Appl. No.: 12/412,350

(22) Filed: Mar. 26, 2009

(65) Prior Publication Data

US 2009/0242005 A1 Oct. 1, 2009

(30) Foreign Application Priority Data

Mar. 26, 2008 (DE) .................... 10 2008 015 796

(51) Int. Cl.
*B08B 3/10* (2006.01)
(52) U.S. Cl. ....................... 134/108; 134/186
(58) Field of Classification Search .............. 134/105, 134/108, 186
See application file for complete search history.

(56) References Cited

U.S. PATENT DOCUMENTS

| | | | | | |
|---|---|---|---|---|---|
| 3,319,704 | A | * | 5/1967 | Nasse | 165/95 |
| 3,439,738 | A | * | 4/1969 | Wasil et al. | 165/143 |
| 4,256,170 | A | * | 3/1981 | Crump | 165/154 |
| 4,529,032 | A | * | 7/1985 | Molitor | 165/301 |
| 4,531,572 | A | * | 7/1985 | Molitor | 219/201 |
| 5,017,852 | A | * | 5/1991 | Nagata et al. | 318/727 |
| 5,660,193 | A | * | 8/1997 | Archer et al. | 134/56 D |
| 7,526,879 | B2 | * | 5/2009 | Bae et al. | 34/596 |
| 2009/0277482 | A1 | * | 11/2009 | Kim et al. | 134/105 |

FOREIGN PATENT DOCUMENTS

| | | | |
|---|---|---|---|
| CA | 1 148 934 | * | 6/1983 |
| DE | 30 11 565 | * | 10/1981 |
| DE | 39 00 617 | * | 7/1990 |
| DE | 299 23 594 U1 | | 1/2001 |
| DE | 103 34 792 A1 | | 2/2005 |
| DE | 10 2006 003 816 | * | 8/2007 |
| DE | 10 2006 004 756 | * | 8/2007 |
| JP | 57-041585 | * | 3/1982 |
| JP | 10-080391 | * | 3/1998 |
| JP | 11-113831 | * | 4/1999 |
| JP | 2000-354580 | * | 12/2000 |
| JP | 2006021270 | * | 3/2006 |

* cited by examiner

*Primary Examiner* — Frankie L Stinson
(74) *Attorney, Agent, or Firm* — Muncy, Geissler, Olds & Lowe, PLLC

(57) ABSTRACT

A cleaning machine, in particular a batch dishwasher, comprising an individual cleaning chamber in which the items to be cleaned are accommodated, a pump which circulates washing liquid within the cleaning chamber, and a further pump which delivers fresh water, and also a boiler which stores and heats fresh water, wherein the boiler has an associated heat exchanger by means of which heat is indirectly or directly transferred from waste water which is stored in a reservoir to the fresh water which is stored in the boiler.

12 Claims, 2 Drawing Sheets

BATCH DISHWASHER WITH WASTE WATER HEAT RECOVERY

This nonprovisional application claims priority under 35 U.S.C. §119(a) to German Patent Application No. 10 2008 015 796.1, which was filed in Germany on Mar. 26, 2008, and which is herein incorporated by reference.

BACKGROUND OF THE INVENTION

1. Field of the Invention

The present invention relates to a cleaning machine, in particular a dishwasher which has a cleaning chamber, in which cleaning machine the items to be cleaned are cleaned in line with a program sequence of pre-washing, cleaning and drying steps, in particular for commercial use.

2. Description of the Background Art

In dishwashers in which the washware is not transported during the cleaning process and in which the cleaning steps proceed in accordance with a predefined program, a distinction is drawn between two basic variants:

Firstly, dishwashers with a tank system in which a washing liquid is stored are known. The washware which is continuously introduced is cleaned with this washing liquid, without said washing liquid being discarded after a cleaning cycle. Following the cleaning process, fresh water which has been heated in a boiler or a flow heater is applied to the washware via an additional rinsing system. All or some of this introduced rinse water is used to regenerate the washing liquid. These machines with a two-circuit system are mainly used in commercial operations since very short cycle times, for example of less than 60 seconds up to a few minutes, can be achieved with said machines.

Secondly, dishwashers with water replacement systems are known. In machines which are operated in accordance with this principle, fresh water is used in each cleaning cycle for the method steps of cleaning and rinsing, or the wash water from the first cleaning cycle is used as cleaning liquid for the second cleaning cycle and is then discarded. These machines are mainly used in the domestic sector. The respective replacement of the washing liquid and/or rinsing solution and the associated heating of the liquids result—compared to dishwashers with a two-circuit system—in longer cycle times, for example of up to more than 2 hours.

Single-chamber systems of this type are often designed as "front loaders" and have a washing chamber with a front flap which is to be opened in order to load washware into and unload washware from the washing chamber. Dishwashers of this type can be designed for various purposes and may be used, for example, as free-standing appliances or else as under-counter appliances.

DE 299 23 594 U1 discloses, for example, a commercial dishwasher with a two-circuit system. This dishwasher comprises at least one washing chamber and in each case a wash water tank which is associated with each washing chamber. A heating device for the wash water in the wash water tank and a circulation pump for the wash water with a motor drive may be provided. Said circulation pump takes in heated wash water from the wash water tank via an intake line and supplies said wash water, via at least one pressure line, to spray nozzles of at least one spray device, in order to spray wash water onto the washware. Said washware is accommodated on a mount within the washing chamber. An air supply device which is integrated in the intake line of the circulation pump is provided. Also present is a control device which permits air to be supplied only during the starting phase of the washing process with hot water.

Peltier elements and their manner of operation are known. A document which was downloaded from the Internet site http://de.wikipedia.org/wiki/Peltier-Element on Feb. 13, 2008 describes the structure and manner of operation of a Peltier element. A Peltier element comprises two or more small cuboids in each case composed of p- and n-doped semiconductor material (bismuth telluride, $Bi_2Te_3$, silicon germanium) which are connected to one another alternately at the top and at the bottom by metal bridges. The metal bridges at the same time form the thermal contact areas and are insulated by an applied film or foil or a ceramic plate. Two different cuboids are always connected to one another such that they produce a series circuit. The supplied electric current flows through all the cuboids in succession. Depending on the current intensity and direction, the upper connection points cool down, whereas the lower connection points heat up. The current therefore pumps heat from one side to the other and creates a temperature difference between the plates.

The most common form of Peltier element comprises two usually square plates composed of $Al_2O_3$ ceramic (aluminum oxide) with an edge length of 20 mm to 90 mm and a gap of from 3 mm to 5 mm, between which plates the semiconductor cuboids are soldered in. To this end, the ceramic surfaces are provided on their mutually facing surfaces with metal faces which can be soldered.

If the warm side is cooled down, for example by means of a mounted heat sink with a fan, the cooling side becomes even colder. The temperature difference between the two sides can be, depending on the element and the current, up to approximately 69 Kelvin in the case of one-stage elements.

Applications of Peltier elements in conjunction with dishwashers are likewise known. DE 103 34 792 A1, for example, describes a domestic dishwasher of known design, that is to say with water replacement, which is additionally equipped with a device for drying the dishes which have been cleaned and rinsed. In this device, air is taken from the washing chamber, conducted past the cold side of a Peltier element, and thus dried. The dried air is again conducted into the washing chamber. The air in the interior of the washing chamber is heated using the waste heat from the Peltier element.

Further known applications of Peltier elements in conjunction with dishwashers always concern the dissipation of heat from the air of the interior and thus deliberate condensation of the contained moisture.

The conventional dishwashers, however, have the disadvantage that the thermal energy which is located in the waste water has not been used further by the dishwasher or its working processes.

In the case of water replacement machines, this would be, for example per washing cycle, the heat content of 2×10 l of water at a temperature of 50-60° C. In the case of dishwashers with a two-circuit system, it can be, for example per washing cycle, 2.5 l of water at a temperature of 60° C. This quantity likewise adds up to an appreciable volume, and thus to a considerable heat content, over the number of washing cycles per working day.

When batch dishwashers with waste water heat recovery have been disclosed to date, tube heat exchangers of conventional design were used in the process. In addition to a modest effect, these had the disadvantages of high susceptibility to soiling and a lack of controllability.

SUMMARY OF THE INVENTION

It is therefore an object of the present invention to improve the recovery of the heat contained in the waste water and using it to heat up fresh water in a single-chamber cleaning machine, in particular a single-chamber dishwasher with a program sequence, for commercial use.

In a batch dishwasher, that is to say a single-chamber dishwasher, in particular a commercial dishwasher, the invention proposes utilizing the heat contained in the waste water and, with the interconnection of an active temperature pick-up device, for example a Peltier element, preheating the fresh water which is otherwise heated solely by a heating body in the boiler. Heat is recovered from the waste water in the waste water discharge line from a waste water reservoir on the machine and is given off via the Peltier element indirectly or directly to the fresh water which is to be heated and is stored in the boiler.

This solution for recovering the heat contained in the waste water can be used both in dishwashers with a single-circuit system and water replacement and also in dishwashers with a two-circuit system.

Therefore, for example in batch dishwashers which operate with water replacement, fresh water is required for the method step of cleaning and for the method step of rinsing in each of these steps, it being possible for said fresh water to be preheated by means of the heated water which is used in the respectively preceding method step. In the event of water replacement, the used cleaning or rinsing fluid gives off its inherent heat to the cleaning fluid which is to be used in the next method step. The heat present in the waste water, which is at a temperature level of between 50° C. and 60° C., can thus be used to preheat the fresh water which is to be used in the respectively following method step. Consequently, the heating power required to heat the fresh water which is to be used in the next method step can be lowered by the amount which is created by preheating using the waste water.

In dishwashers with a two-circuit system, dirty washing liquid is pumped out of the wash water tank before the washware is rinsed with fresh water. The thermal energy which is contained in this quantity of water can likewise be transferred to the inflowing quantity of fresh water in a manner according to the invention, for example by means of a Peltier element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
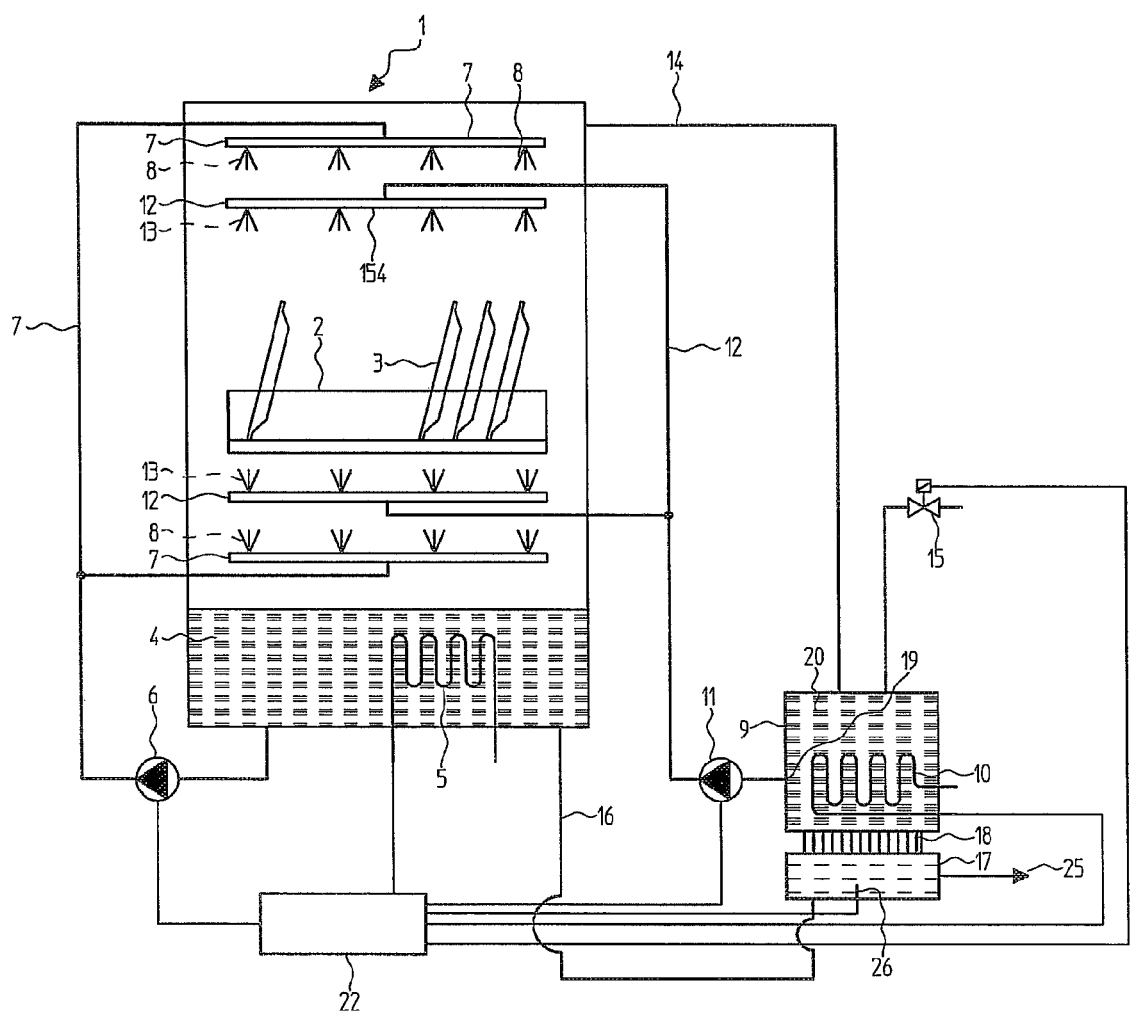
FIG. 1 schematically shows a batch dishwasher with a two-circuit system and a waste water heat exchanger.

The illustration according to FIG. 1 shows a cleaning machine which is, in particular, a batch dishwasher having one chamber. A rack 2 for accommodating the washware 3 to be cleaned, which rack is fixed by means of suitable mounts within the cleaning chamber, is provided in said cleaning machine. The schematically illustrated dishwasher 1 may be in the form either of a front-loaded unit, a top-loaded variant or else a pass-through unit. The batch dishwasher 1 comprises a tank 4 for accommodating the washing liquid. A heater 5 is arranged within the tank 4 in order to heat the washing liquid. The washing liquid contained in the tank 4 is admixed with detergent and heated to the respectively required temperature by means of the heater 5.

The batch dishwasher 1 also comprises a controller 22 by means of which the cleaning program which is respectively to be run is controlled. This controller activates, for example, the pump 6 for circulating the washing liquid, which pump delivers washing liquid to the nozzles 8 via the washing system 7. The heated washing liquid is sprayed onto the washware 3 to be cleaned via the nozzles 8 and the washware is thus cleaned. The washing liquid then drips off the washware 3, back into the tank 4, and is further circulated by the circulation pump 6.

The batch dishwasher 1 also comprises a boiler 9. The boiler 9 contains a heater 10 in order to heat fresh water 20 which is to be heated in the boiler 9 to the temperature required for rinsing, for example 85° C. The boiler 9 is filled via a filling valve 15. The boiler 9 and the cleaning chamber of the batch dishwasher 1 are connected to one another via a ventilation line 14.

After cleaning, the circulation pump 6 is switched off by means of the controller 22.

After a break for draining, during which the dirt and washing liquid drain from the washware 3 to be cleaned, the further pump 11 is switched on and the heated fresh water (rinse water) is sprayed onto the cleaned washware 3 by means of the washing system 12 for rinsing, which washing system is designed as a spray system, and the nozzles 13 which are provided on this washing system, and so said washware is rinsed. As a result, any particles of dirt still adhering to the washware and the washing liquid are washed away. The rinse water falls into the tank 4 and serves to regenerate the washing liquid stored in this tank. Any excess washing liquid which is produced is pumped away or runs out via an outlet (not illustrated in any detail here).

The illustration according to FIG. 1 shows that a waste water line 16 runs out of the tank for washing liquid 4 to a reservoir 17. The reservoir 17 (storage volume of approximately 2 l to 3 l) is filled with waste water via this waste water line, said waste water, for example, still being at a temperature of the order of magnitude of approximately 50° C. to 60° C. The waste heat from the waste water which is stored in the reservoir 17, be it washing liquid which has been pumped away following the cleaning step or regenerated washing liquid which is continuously diluted by supplied fresh water in the rinsing step, is stored in the reservoir 17 and gives off heat to the boiler 9 via a heat exchanger 18. The means with which this flow of waste water is controlled or regulated are not illustrated and may be, for example, one or more valves, preferably electrically actuated valves, or one or more pumps.

On account of the lower temperature of the fresh water 20 which is stored in the boiler or fresh water which is newly supplied via the filling valve 15, heat can be transmitted via the interposed heat exchanger 18. This transferred quantity of heat is now no longer to be applied by the heater 10, and so actuation of said heater by the control device 22 can be correspondingly reduced or shortened.

In the event of water replacement in the reservoir 17 in the direction of an outflow 25 (not illustrated in any detail in the illustration according to FIG. 1), the waste water which is accordingly cooled by means of the heat exchanger leaves the reservoir 17 in the direction of the outflow, and so the reservoir 17 can again be filled with washing liquid from the tank 4 or with regenerated washing liquid.

Figure 2:
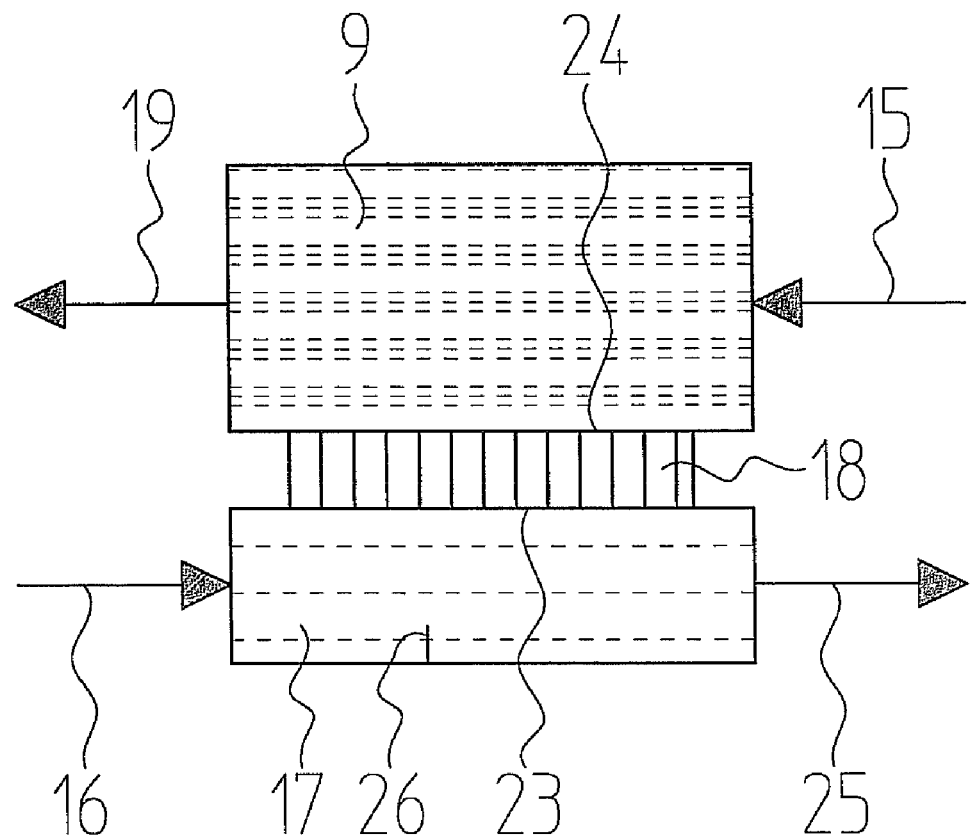
FIG. 2 shows a heat exchanger between a waste water reservoir and a heating device for fresh water which is to be heated.

FIG. 2 shows an enlarged schematic illustration of the heat transfer process.

Fresh water flows to the boiler 9 via the filling valve 15. In the boiler, this water is heated to the required temperature for rinsing, that is to say, for example, 85° C., before being supplied to the rinsing systems 12 of the batch dishwasher 1 by means of the further pump 11 via the intake point 19.

An active heat exchanger, which is preferably designed as a Peltier element, is located between a boundary wall 24 of the boiler 9 and a wall 23 which the limits the reservoir 17. The Peltier element 18 which is arranged between the walls 24 of the boiler 9 and the wall 23 of the reservoir 17 transfers the heat inherent in the waste water which is stored in the reservoir 17 to the fresh water supply which is stored in the boiler 9. The thermal energy which is taken via the Peltier element 18 from the waste water stored in the reservoir 17 and is transmitted to the fresh water in the boiler 9 now no longer needs to be provided by the heater 10 which is associated with the boiler 9. The heater 10 is now switched on only for a short time in order to increase the temperature of the rinse water the rest of the way to the 85° C. cited above by way of example.

So that a Peltier element can transfer heat, it requires an electric voltage supply. The electrical drive power consumed by the Peltier element is then generally given off to the outside as waste heat and thus leads to a reduction in the efficiency of the entire system. In this special application, the waste heat from the Peltier element is also given off to the fresh water in the boiler, and so the efficiency of the system according to the invention is relatively high. This is to be assessed as an additional advantage of this novel system.

The design of the combination comprising boiler and heat exchanger with a reservoir 17 is therefore based on the quantity of waste water being produced in a relatively short time, that is to say, for example, 2.5 l per cycle in 10 seconds, in the program sequence of the single-tank dishwasher. If the thermal energy contained in the waste water now has to be withdrawn in this 10 seconds, or the waste water temperature has to be reduced from, for example, 60° C. to 40° C. in this 10 seconds, this would result in the heat exchanger having to be very large. By virtue of the proposed combination of the system with a reservoir, the residence time of the waste water in the heat exchanger is increased. The heat exchanger can therefore be kept small, this being advantageous both with regard to the overall volume and the production costs.

In order to further improve heat transfer from the waste water side to the fresh water side, it is expedient to supply the active surfaces of the Peltier heat exchanger in countercurrent. This is additionally indicated in FIG. 2. Said figure schematically shows that the reservoir 17 is supplied by the waste water line 16 from the tank for washing liquid 4 and water flows through in the direction of the outflow 25, this taking place in the opposite direction to the flow through the boiler 9 from the filling valve 15 for feeding fresh water to the intake point 19 of the further pump 11.

A further advantageous addition to the entire novel system is provided by a temperature sensor 26 being mounted in the waste water reservoir 17. This temperature sensor can be used to identify when the temperature in the waste water reservoir reaches a predetermined lower limit, for example 40° C. At this moment, the Peltier element would be disconnected from the electric voltage supply. This can prevent the waste water being excessively cooled and, for example, fat-containing constituents of the waste water solidifying and accumulating in the reservoir or on the heat exchanger surfaces. An accumulation process of this type could adversely affect the functioning of the system or lead to hygiene problems.

At the same time as the Peltier element is switched off, the heater 10 would be switched on, in order to heat the fresh water in the boiler to the required temperature. If the heater 10 were already switched on during the heat exchange operation, the temperature gradient between the wall 23 of the reservoir and the wall 24 of the boiler would level off, and this would again lead to a disadvantage for the entire system.

A further advantage of the system according to the invention can be described using the temperature sensor illustrated in FIG. 2. If the heat exchanger surfaces on the reservoir side were to become soiled with fat-containing constituents of the waste water despite expectations, this would lead, on account of the insulating effect of the coverings, to impaired performance of the system. This impaired performance, that is to say lower dissipation of heat per unit time or smaller reduction in temperature over unit time in the reservoir, can be identified by the temperature sensor in conjunction with the controller 22. The controller 22 can now briefly reverse the polarity of the supply voltage applied to the Peltier heat exchanger. As a result, the Peltier element would heat up on the previous heat absorption side, the intended cool side. This then leads to the fat-containing deposits melting away and the original efficiency of the system being established.

In addition to the advantages already mentioned, the use of the active heat exchanger, for example the Peltier element, results in the fact that the temperature level at which the recovered energy can be supplied to the following method steps is considerably greater than the waste water temperature. This is advantageous for the entire process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cleaning machine comprising:
   an individual cleaning chamber in which items to be cleaned are accommodated;
   a pump configured to circulate washing liquid within the cleaning chamber;
   a further pump configured to deliver fresh water; and
   a boiler configured to store and heat fresh water, the boiler having an associated active heat exchanger via which heat is indirectly or directly transferred from waste water, which is stored in a reservoir, to the fresh water, which is stored in the boiler,
   wherein the heat exchanger is arranged between a wall of the reservoir and a wall which delimits the boiler, and including a controller that can briefly reverse a polarity of a supply voltage applied to a Peltier heat exchanger in order to heat a side of the Peltier element that comprised a heat absorption side of the Peltier element prior to the polarity reversal.

2. A cleaning machine comprising:
   an individual cleaning chamber in which items to be cleaned are accommodated;
   a pump configured to circulate washing liquid within the cleaning chamber;
   a further pump configured to deliver fresh water; and
   a boiler configured to store and heat fresh water, the boiler having an associated active heat exchanger via which heat is indirectly or directly transferred from waste water, which is stored in a reservoir, to the fresh water, which is stored in the boiler, wherein the heat exchanger has a first portion in thermal contact with a wall of the reservoir and a second portion in thermal contact with a wall of the boiler.

3. A cleaning machine comprising:
an individual cleaning chamber in which items to be cleaned are accommodated;
a pump configured to circulate washing liquid within the cleaning chamber;
a further pump configured to deliver fresh water; and
a boiler configured to store and heat fresh water, the boiler having an associated active heat exchanger via which heat is indirectly or directly transferred from waste water, which is stored in a reservoir, to the fresh water, which is stored in the boiler, wherein the heat exchanger is designed as a Peltier element and is arranged between a wall of the reservoir and a wall which delimits the boiler.

4. The cleaning machine as claimed in claim 3, wherein the heat exchanger is arranged on a wall of the reservoir and gives off its waste heat indirectly, via a liquid circuit and heat exchanger or heating coil to the fresh water which is stored in the boiler.

5. The cleaning machine as claimed in claim 3, wherein a waste water line runs between a tank, in which washing liquid is stored, and the reservoir.

6. The cleaning machine as claimed in claim 3, wherein the heat exchanger is arranged between a wall which delimits the tank for washing liquid and a wall which delimits the boiler.

7. The cleaning machine as claimed in claim 3, wherein the heat exchanger is arranged on a wall which delimits the tank for washing liquid, and gives off its waste heat indirectly via a liquid circuit and heat exchanger or heating coil to the fresh water which is stored in the boiler.

8. The cleaning machine as claimed in claim 3, wherein the activation time of a heater, which is associated with the boiler, is shortened in the event of the fresh water, which is stored in the boiler, is preheated either by the washing liquid taken from the tank or by the waste water which is stored in the reservoir.

9. The cleaning machine as claimed in claim 3, wherein a temperature sensor is associated with the heat exchanger and/or the reservoir, and wherein the functioning of the Peltier element is influences with the aid of a controller using a temperature sensor.

10. The cleaning machine as claimed in claim 3, in which activation of the heat exchanger permits operation which permits a self-cleaning effect at the heat exchanger.

11. The cleaning machine according to claim 3, wherein the cleaning machine is a batch dishwasher.

12. The cleaning machine according to claim 3, wherein the heat exchanger has a first portion in thermal contact with the wall of the reservoir and a second portion in thermal contact with the wall that delimits the boiler.

* * * * *